United States Patent
Herz

(10) Patent No.: US 8,538,062 B1
(45) Date of Patent: Sep. 17, 2013

(54) SYSTEM, METHOD, AND COMPUTER PROGRAM PRODUCT FOR VALIDATING AN ASPECT OF MEDIA DATA PROCESSING UTILIZING A SIGNATURE

(75) Inventor: William S. Herz, Hayward, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1121 days.

(21) Appl. No.: 12/200,556

(22) Filed: Aug. 28, 2008

(51) Int. Cl.
*G06K 9/00* (2006.01)

(52) U.S. Cl.
USPC .......................................... 382/100; 382/162

(58) Field of Classification Search
None
See application file for complete search history.

(56) References Cited

U.S. PATENT DOCUMENTS

| | | | |
|---|---|---|---|
| 5,966,129 A | 10/1999 | Matsukuma et al. | |
| 6,591,060 B1 | 7/2003 | Buckley et al. | |
| 6,748,421 B1 | 6/2004 | Ozkan et al. | |
| 6,870,945 B2 | 3/2005 | Schoepflin et al. | |
| 7,095,416 B1* | 8/2006 | Johns et al. | 345/522 |
| 7,313,248 B2* | 12/2007 | Tonisson | 382/100 |
| 7,363,742 B2 | 4/2008 | Nerheim | |
| 7,558,730 B2 | 7/2009 | Davis et al. | |
| 2003/0190078 A1* | 10/2003 | Govindaswamy et al. | 382/232 |
| 2005/0286863 A1 | 12/2005 | Howarth | |
| 2006/0047967 A1* | 3/2006 | Akhan et al. | 713/176 |
| 2006/0080743 A1* | 4/2006 | Zhu et al. | 726/30 |
| 2006/0117183 A1* | 6/2006 | Hatano et al. | 713/176 |
| 2006/0153296 A1* | 7/2006 | Deng | 375/240.12 |
| 2008/0175377 A1* | 7/2008 | Merrill | 380/30 |
| 2008/0189580 A1 | 8/2008 | Kim et al. | |

OTHER PUBLICATIONS

U.S. Appl. No. 11/958,289, filed Dec. 17, 2007.
"Multimedia Security Research at Purdue University," http://cobweb.ecn.purdue.edu/~ace/water2/digwmk.html, Oct. 9, 1999.
DeCanne, "A/D, D/A Conversion for HDTV," CSD May 2000 Multimedia Supplement Feature, http://www.commsdesign.com/main/multsupp/0005/0005hdtv.htm.
Non-Final Office Action from U.S. Appl. No. 12/200,519, dated Oct. 14, 2011.
Herz, W. S., U.S. Appl. No. 12/200,519, filed Aug. 28, 2008.
Final Office Action from U.S. Appl. No. 12/200,519, dated Mar. 29, 2012.
Advisory Action from U.S. Appl. No. 12/200,519, dated Jun. 7, 2012.
Final Office Action from U.S. Appl. No. 12/200,519, dated Apr. 29, 2013.

* cited by examiner

*Primary Examiner* — Li Liu
(74) *Attorney, Agent, or Firm* — Zilka-Kotab, PC

(57) ABSTRACT

A system, method, and computer program product are provided for validating an aspect of media data processing utilizing a signature. In use, media data is received in a system. Additionally, at least one signature of at least a portion of the media data is generated. Furthermore, at least one aspect of processing of the media data by the system is validated utilizing the at least one signature.

12 Claims, 11 Drawing Sheets

SYSTEM, METHOD, AND COMPUTER PROGRAM PRODUCT FOR VALIDATING AN ASPECT OF MEDIA DATA PROCESSING UTILIZING A SIGNATURE

FIELD OF THE INVENTION

The present invention relates to media data processing, and more particularly to validating media data processing.

BACKGROUND

Media data has typically taken the form of visual and/or audio data and is often the subject of a variety of processing before being output. However, techniques employed for controlling such processing have generally exhibited various limitations. For example, sometimes the processing results in unwanted changes to the media data, such as frames of the media data being dropped, etc. Traditional techniques for detecting unwanted changes to the media data have conventionally utilized a pixel for pixel comparison of a state of the media data before processing thereof and a state of the media data after processing thereof. Accordingly, such traditional techniques have consumed a cumbersome amount of time and memory resources.

There is thus a need for addressing these and/or other issues associated with the prior art.

SUMMARY

A system, method, and computer program product are provided for validating an aspect of media data processing utilizing a signature. In use, media data is received in a system. Additionally, at least one signature of at least a portion of the media data is generated. Furthermore, at least one aspect of processing of the media data by the system is validated utilizing the at least one signature.

DETAILED DESCRIPTION

Figure 1:
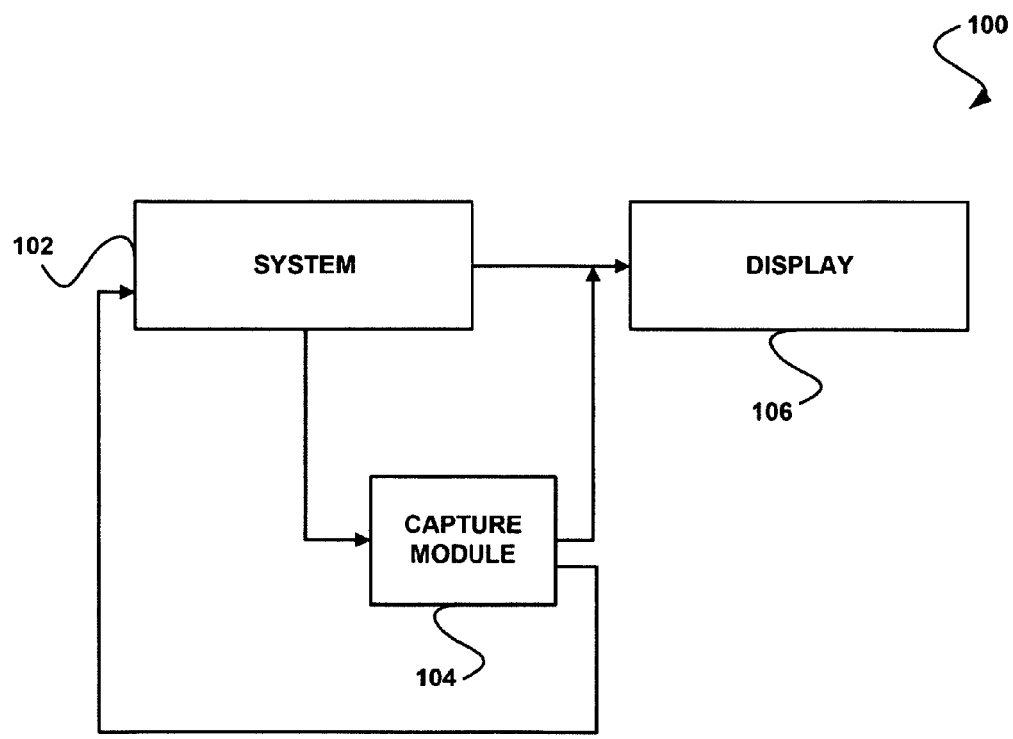
FIG. 1 shows a media processing system, in accordance with one embodiment.

FIG. 1 shows a media processing system 100, in accordance with one embodiment. As shown, a system 102 is in communication with (e.g. coupled to, etc.) a display 106. With respect to the present embodiment, the system 102 may include any device capable of displaying media data (e.g. video data, etc.) via the display 206. For example, the system 102 may communicate media data to the display 106 for display thereof. The display 106 may include a computer monitor, a television, and/or any other display capable of displaying media data received from the system 102.

In one embodiment, the system 102 may process the media data prior to displaying the media data via the display 106. Accordingly, the system 102 may include a processor for performing such media data processing.

As also shown, a capture module 104 is in communication with the system 102. In particular, the capture module 104 is separate from the system 102. The capture module 104 may include a device with a processor and memory. Thus, for example, the capture module 104 may include memory external to the system 104. Of course, as another option the capture module may include any hardware or software.

Further, the capture module may be capable of processing various command and control bits received from the system 102. Such command and control bits may include a begin capture command, a stop capture command, a pixel mask enable command, a pixel mask control bit, a signature analysis pixel start command, a signature analysis pixel stop command, a signature analysis color component control bit, a capture pixels range start frame control bit, a capture pixels range stop frame control bit, a capture pixels range start line control bit, a capture pixels range stop line control bit, a capture pixels range start pixel control bit, a capture pixels range stop pixel control bit, a capture pixels range color component control bit, a playback pixels range start frame control bit, a playback pixels range stop frame control bit, a playback pixels range start line control bit, a playback pixels range stop line control bit, a playback pixels range start pixel control bit, a playback pixels range stop pixel control bit, a playback pixels range color component control bit, and/or a playback signature analysis command.

In one embodiment, the capture module 104 may capture (e.g. record, etc.) media data from the system 102. For example, the capture module 104 may capture media data after processing of the media data by the system 102. Optionally, the capture module 104 may capture media data via an interface [e.g. digital visual interface (DVI), High-Definition Multimedia Interface (HDMI), etc.] of the system 102. As another option, such interface may be in direct communication with the processor of the system 102 for allowing the capture module 104 to capture the media data from system 102 in any desired manner. As yet another option, the capture module 104 may capture the media data in real-time.

Additionally, the capture module 104 may incorporate commands in a content portion of the media data. Such commands may optionally be utilized to control the capturing of the media data. For example, the commands may include a start command for indicating when capturing of the media is to start and a stop command for indicating when capturing of the media is to stop. As an option, the content portion of the media data in which the commands are incorporated may be pixels.

Further, the capture module 104 may store the captured media data. For example, the capture module 104 may store the captured media in memory (e.g. non-volatile memory, etc.) of the capture module 104. In this way, the media data captured from the system 102 may be stored in memory separate from the system 102.

In use, the capture module 104 may feed the media data back to the system 202 for being processed as a function of the commands. The media data may be fed back to the system 102 via an interface of the system 102, such as a universal serial bus (USB) interface, for example. Optionally, the capture module 104 may feed the media data back to the system 102 in non-real time or real-time. In this way, the capture module 104 may store the media data for a temporary time period (e.g. until requested by the system 102 for being processed as a function of the commands, for a predetermined period of time, etc.).

In response to receiving the media data from the capture module 104, the system 102 may process the media data as a function of the commands. For example, the system 102 may utilize the media data fed back from the capture module 104 processing thereof as a function of the commands. Accordingly, the processing of the media data as a function of the commands may include capturing the media data as a function of the commands (e.g. beginning capture of the media in response to identification of a start command incorporated in the media data, stopping capture of the media data in response to identification of a stop command incorporated in the media data, etc.). As an option, a loop through may be provided for the system 102, such that the media data that is captured may be displayed via the display 106.

In another embodiment, media data in the system 102 may be received. As an option, the media data may be received (e.g. captured) by the capture module 104. For example, the capture module 104 may receive the media data via the interface (e.g. DVI, HDMI, etc.) of the system 102.

Moreover, at least one signature of at least a portion of the media data may be generated (e.g. via the capture module 104). Such signature may reflect any or all color components of each frame of the media data. Thus, the signature may reflect at least a portion of the media data.

Still yet, the media data may be acted upon utilizing the signature. Optionally, the system 102 may process the media data based on the signature. Just by way of example, the system 102 may assess the media data utilizing the signature.

Such assessment may be performed by comparing the generated signature to another signature (e.g. a predetermined signature for the media data), in one embodiment. The predetermined signature may indicate a more ideal copy of the media data (e.g. golden copy, an unprocessed copy of the media data, etc.). As an option, the predetermined signature may include a signature generated by the system 102 in a same manner in which the signature is generated by the capture module 104.

In this way, it may be determined whether the media data has changed from a more ideal copy of the media data, based on the comparison. For example, if the generated signature and the other signature are different, such may be an indication of the media processing capabilities of the system 102 (e.g. whether the media processing of the system 102 reduces a quality of the media data, drops the media data, causes problems with audio-video synchronization, etc.).

Figure 2:
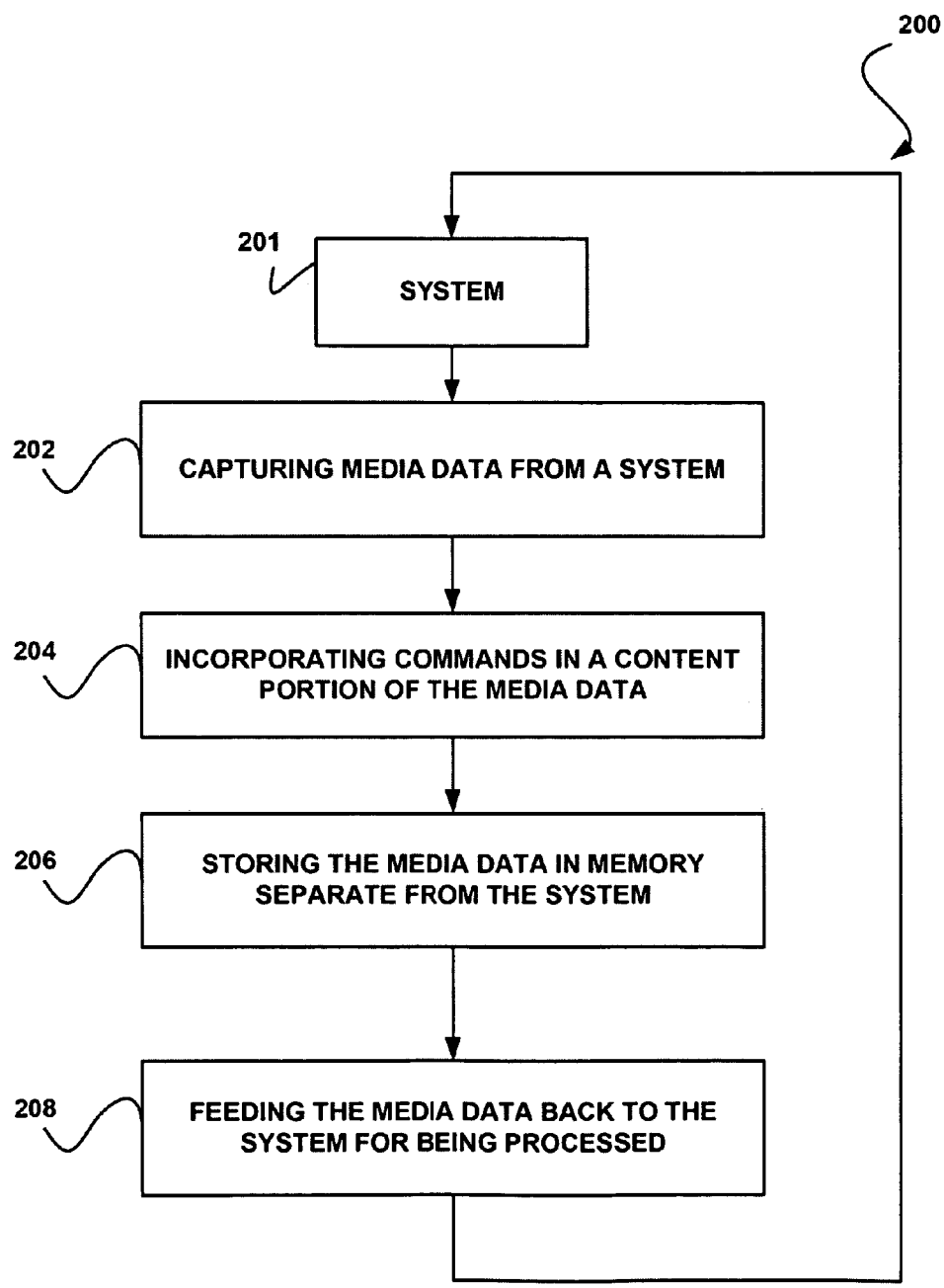
FIG. 2 shows a media capture method for incorporating commands into media data content, in accordance with another embodiment.

FIG. 2 shows a media capture method 200 for incorporating commands into media data content, in accordance with another embodiment. As an option, the media capture method 200 may be carried out via the system 100 of FIG. 1. Of course, however, the media capture method 200 may be carried out in any desired environment. It should also be noted that the aforementioned definitions may apply during the present description.

As shown in operation 202, media data is captured from a system 201. In the context of the present description, the system 201 may include any system from which media data may be captured that is capable of processing the media data as a function of commands incorporated in a content portion of the media data. For example, in various embodiments, the system 201 may include a client computer, a server computer, a mobile device, etc. As another example, the system 201 may include the system 102 of FIG. 1.

Additionally, the media data may include graphics data (e.g. visual data), in one embodiment. Such graphics data may include at least one pixel of an image displayed via a display of the system 201. For example, the image may include a plurality of pixels. In another embodiment, the media data may include video data, such as at least one pixel of video displayed via the system display.

In yet another embodiment, the media data may include audio data. Just by way of example, the audio data may include any audio output via the system 201. Of course, it should be noted that the media data may be associated with any type of media (analog and/or digital) capable of being captured from the system 201.

Furthermore, the media data may be captured in any desired manner. In various embodiments, capturing the media data may include receiving, retrieving, recording, etc. the media data from the system 201. In one embodiment, the media data may be captured utilizing an interface. Such interface may include a DVI, an HDMI, etc. Thus, the interface may be in communication with a processor [e.g. graphics processor, graphics processing unit (GPU), a central processing unit (CPU), audio processor, video processor, etc.] of the system 201 for capturing the media data after being processed by such processor.

To this end, media data to be displayed, presented, output, etc. utilizing the system 201 may be captured. As another option, the media data may be captured in real-time. For example, the media data may be captured as the media data is output from the processor (e.g. to an output device, etc.).

In addition, as shown in operation 204, commands are incorporated in a content portion of the media data. The content portion of the media data may include any portion of the media data that is displayed, presented, output, etc. utilizing the system 201. Just by way of example, if the media data includes visual data, the content portion may include pixels.

To this end, incorporating the commands in the content portion of the media data may optionally include inserting the commands in the content portion of the media data, modifying an existing content portion of the media to reflect the commands, etc. As an option, the commands may be incorporated into different sections of the content portion of the media data. In this way, the commands may be encountered at different times during processing of the content portion of the media data.

In one embodiment, the commands may be incorporated in non-essential portions of the media data, or in the video itself. For example, the commands may be incorporated in naturally-occurring pixel values. In such case, a set of naturally-occurring pixel values (e.g. a specific array of R, B, and/or G values, etc.) may be predetermined to correspond with a particular one or more commands, etc.

It should be noted that the commands may include any commands as a function of which the media data may be processed. For example, the commands may include a start command (e.g. for indicating that capturing of the content portion of the media data is to begin), a stop command (e.g. for indicating that capturing of the content portion of the media data is to stop), etc. The commands may therefore be utilized to control the capturing of the media data, as an option.

In one embodiment, the commands may be incorporated by setting a value (e.g. color value, etc.) associated with at least one pixel of the content portion of the media data. Such value of the pixel(s) may thus reflect the commands (e.g. the value of the pixel(s) may include predetermined values indicative of the commands, etc.). Accordingly, the commands may be identified upon encountering the pixels indicative of the commands.

Furthermore, the media data is stored in memory separate from the system 201, as shown in operation 206. With respect to the present description, the memory may include any type of memory separate from the system 201 that is capable of storing the media data. For example, the memory may include non-volatile memory (e.g. flash memory, etc.), a disk drive, and/or any other memory that meets the above definition.

In one embodiment, the memory may be included in a device that is separate from the system 201. As an option, such device may include a host processor for processing or parsing the media data in addition to the memory for storing the media data. Accordingly, the device may include a separate client computer, server computer, etc. As another option, the device may only include the memory for storing the media data.

In another embodiment, the memory may be in communication with the system 201. For example, the memory may be coupled to the system 201. In this way, the memory may optionally receive the media data from the system 201 via a communication channel between the memory and the system 201.

As an option, only a portion of the media data may be stored. In one embodiment, the portion of the media data may be selected utilizing a mask (e.g. a pixel mask, etc.). The mask may optionally be generated by the system 201. For example, the mask may identify frames of the media data to be stored, pixels of each frame of the media data that are to be stored, color or color component values (e.g. R, G and/or B) for each of such pixels that are to be stored, etc. Thus, the portion of the media data that is stored may include a subset of pixels of each of a plurality of frames of the media data.

Still yet, as shown in operation 208, the media data is fed back to the system 201 for being processed. In one embodiment, the media data may be fed back to the system 201 from the memory. Just by way of example, the media data may be fed back to the system 201 via the communication channel between the memory and the system 201. In another embodiment, the media data may be fed back to the system 201 utilizing another interface. For example, the interface may include an interface of the system 201, such as a USB interface, etc.

In yet another embodiment, the media data may be fed back to the system 201 by packetizing and ordering the media data in a predetermined manner, such that the system 201 may reconstruct the captured media data, and correlate the captured media data (e.g. pixels) by time stamp (e.g. frame, line, pixel, color component, etc.).

Moreover, the media data may be acted upon as a function of the commands by processing the media data in any manner that is based on the commands. For example, the commands may instruct the capture module regarding the manner in which the media data is to be processed. To this end, commands incorporated in the content portion of the media data may be identified (e.g. by reading a content portion of the media data to encounter predetermined pixels indicative of the commands, etc.).

As an option, the commands may be capable of being identified independent of post-processing of the media data. Such post-processing may include any processing of the media data that is subsequent to the processing that is a function of the commands. For example, the post-processing may include rendering the media data, outputting the media data, etc.

In one embodiment, the commands may be identified utilizing a key (e.g. pattern, etc.) that takes into account post-processing of different components of the system 201. In another embodiment, the commands may be identified utilizing thresholds and/or ranges that take into account or are resilient to post-processing of different components of the system 201.

Further still, processing the media data as a function of the commands may include capturing the media data according to the commands. In one embodiment, a portion of the media data may be captured based on the commands. For example, a portion of the media data located between the commands (e.g. between the start command and the stop command) may be captured. The portion of the media data located between the commands may be inclusive of the media data located in the frames in which the commands are located, or may optionally be exclusive of the media data located in the frames in which the commands are located.

As another option, the media data may be fed back to the system 201 for assessing media processing capabilities of the system 201. Such media processing capabilities may optionally be assessed based on a signature generated for the media data, an example of which will be described in more detail with respect to FIG. 6.

In various embodiments, the media processing capabilities assessment may involve gamma correction, decompression, color space control, brightness, saturation, color temperature correction, sharpening, overlay processing, scaling, encoding, de-interlacing, up/down scaling, digital versatile disk (DVD)/Blu-ray decoding, etc. In other embodiments, the media processing capabilities assessment may involve identifying a maximum rate (e.g. frequency, etc.) at which the media data is presented, output, etc., counting and/or analyzing frames of the media data that have been dropped, assessing the quality of the media data (e.g. quality of enhancement of the media data, bit error associated with processing of the media data, quality of decoding of the media data, quality of motion treatment of the media data, etc.), assessing a peak signal-to-noise ratio, assessing audio-video synchronization, etc.

It should be noted that the foregoing examples of media processing are set forth for illustrative purposes only and should not be construed as limiting in any manner. Of course, the media data processing may involve any processing that involves any type of media data. For example, the media processing capabilities of the system 201 may include capabilities of any processor of the system 201, such as a graphics processor, video processor, audio processor, or combination thereof, etc.

Moreover, the media processing capabilities assessment may include any evaluation, analysis, etc. of capabilities of the system 201 in processing media data. For example, the media processing capabilities assessment may assess the capabilities of the system 201 in processing the media data fed back to the system 201. In one possible embodiment, the assessment may include comparing the captured media data to a more ideal copy (e.g. a "golden" copy, etc.) of the media data.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 3A:
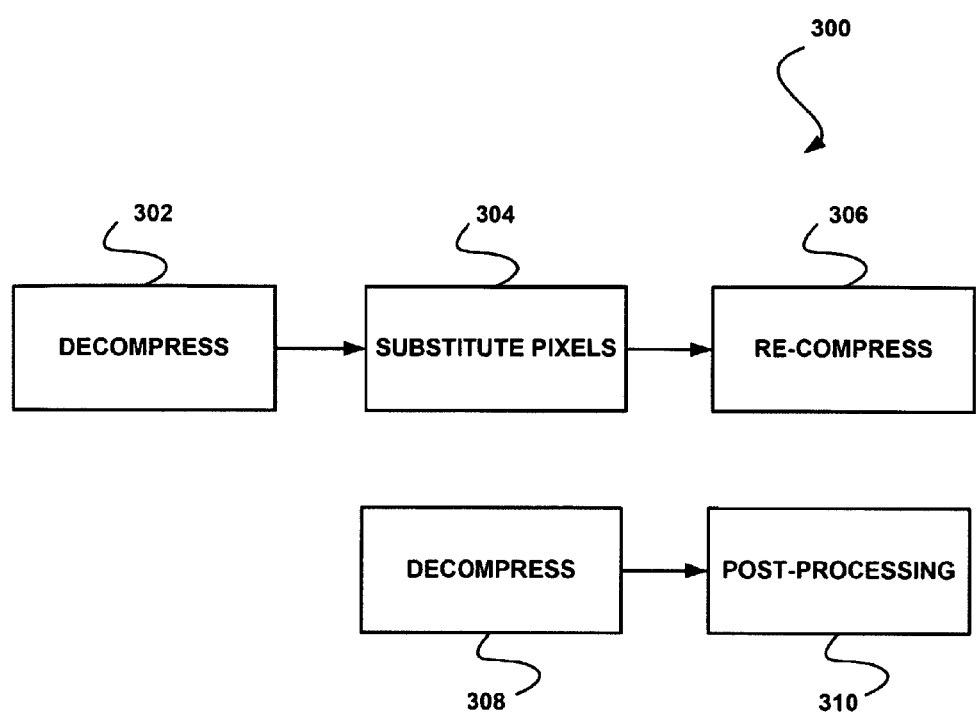
FIG. 3A shows a method for incorporating commands in a content portion of media data and for performing post-processing of the media data, in accordance with yet another embodiment.

FIG. 3A shows a method 300 for incorporating commands in a content portion of media data and for performing post-processing of the media data, in accordance with yet another embodiment. As an option, the method 300 may be carried out in the context of the functionality and architecture of FIGS. 1 and/or 2. Of course, however, the method 300 may be carried out in any desired environment. Again, it should be noted that the aforementioned definitions may apply during the present description.

As shown in operation 302, media data is decompressed. Decompressing the media data may include decoding the media data, decrypting the media data, etc. In one embodiment, the media data may be decompressed by decompressing pixels of the media data.

Additionally, as shown in operation 304, pixels of the media data are substituted. With respect to the present embodiment, the pixels of the media data may be substituted with commands. In one embodiment, the pixels of the media data may be substituted by changing a value of each of the pixels, such that the values reflect the commands.

As an option, a single value of a single pixel may be substituted with a predefined value indicative of a command. In this way, a single pixel may reflect a command (e.g. a start capture command, a stop capture command, etc.). As another option, a single value of each pixel included in a sequence of pixels may be substituted, such that the sequence of pixels includes a predetermined sequence of pixels indicative of a command.

Furthermore, the media data is re-compressed. Note operation 306. Re-compressing the media data may include encoding the media data, encrypting the media data, etc. In this way, the re-compressed media data may include the commands.

Moreover, operations 308-310 may be performed by such system upon receipt of the re-compressed media data from the capture module. As shown, the media data is decompressed in operation 308. In one embodiment, decompressing the media data may include decompressing pixels of the media data. To this end, decompressing the media data may allow the commands included in the media data to be identified. Thus, the media data may optionally be captured according to the commands.

Still yet, post-processing of the media data is performed. Note operation 310. As an option, the post-processing may be performed with respect to the media data captured according to the commands. Such post-processing may include any processing of the media data that is independent of an identification of the commands. For example, the post-processing may include assessing media processing capabilities of the system utilizing a signature of the media data (as describe in more detail below with respect to FIG. 6).

Figure 3B:
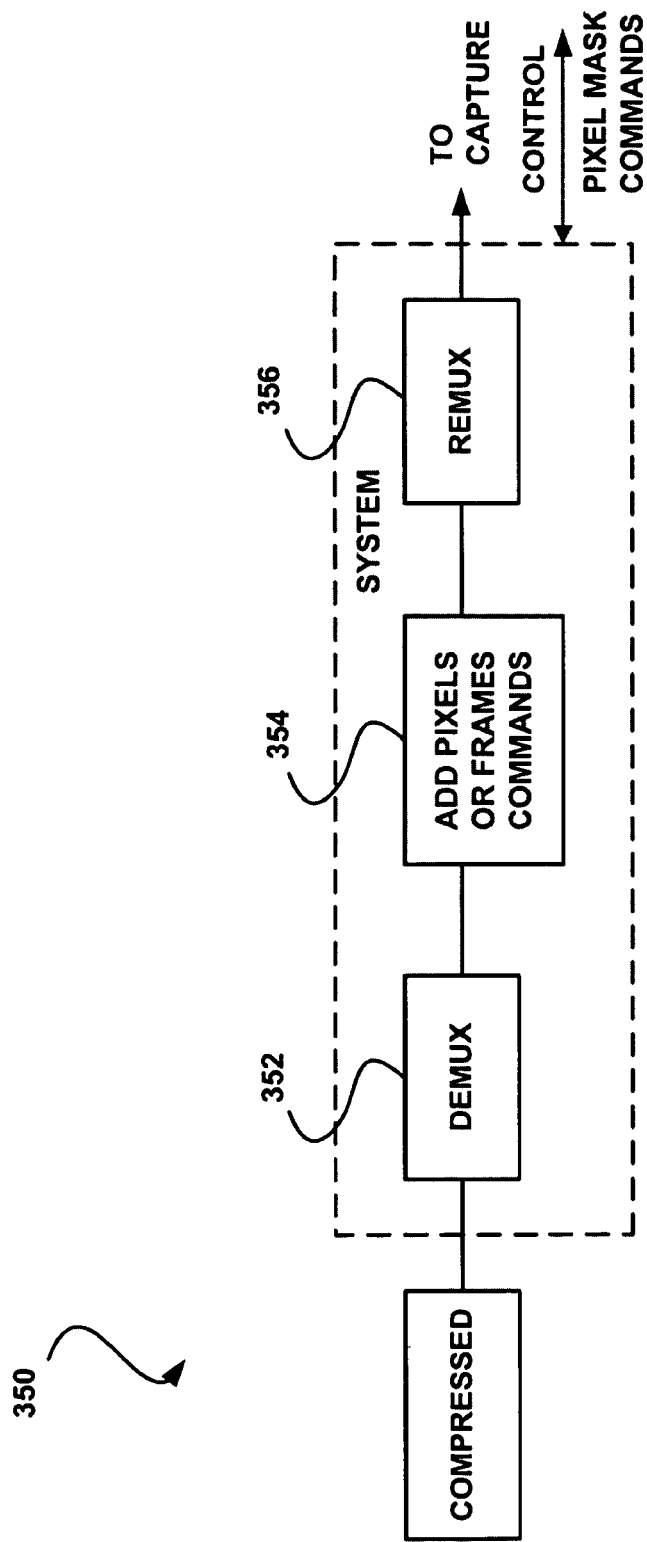
FIG. 3B shows an exemplary system for incorporating commands in a content portion of media data, in accordance with yet another embodiment.

FIG. 3B shows an exemplary system 350 for incorporating commands in a content portion of media data, in accordance with yet another embodiment. As an option, the system 350 may be implemented in the context of the functionality and architecture of FIGS. 1-3A. Of course, however, the system 350 may be implemented in any desired environment. Again, it should be noted that the aforementioned definitions may apply during the present description.

As shown, compressed media data is received by a de-multiplexer 352 of the system 350. Such de-multiplexer 352 then feeds media data to a module 354 for incorporating commands into the media data. Thereafter, the media data (and incorporated commands) are fed to a re-multiplexer 356 for further processing before being fed to a capture module, etc.

Figure 4:
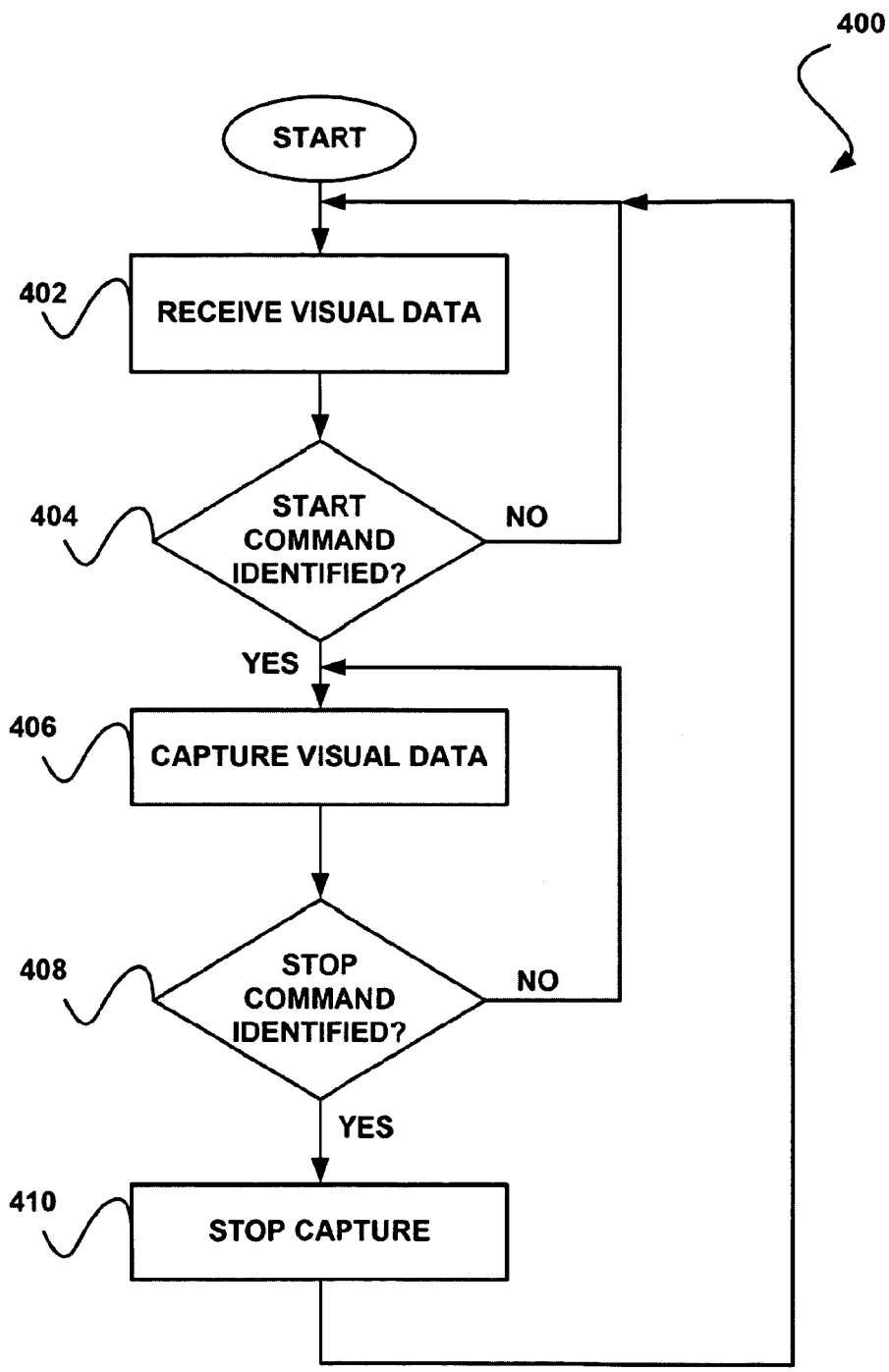
FIG. 4 shows a method for capturing media data, in accordance with still yet another embodiment.

FIG. 4 shows a method 400 for capturing media data, in accordance with still yet another embodiment. As an option, the method 400 may be carried out in the context of the functionality and architecture of FIGS. 1-3. For example, the method 400 may be carried out by the capture module 104 of FIG. 1. Of course, however, the method 400 may be carried out in any desired environment. Again, it should be noted that the aforementioned definitions may apply during the present description.

As shown in operation 402, visual data is received. The visual data may include video data, for example. In one embodiment, the visual data may be received from a system separate from a capture module utilized for capturing the visual data, for example.

Additionally, as shown in decision 404, it is determined whether a start command is identified. In one embodiment, as the visual data is received, the visual data may be read for identifying the start command. For example, content of the visual data may be compared with predetermined content indicative of a start command, such that a match may result in identification of the start command. With respect to the present embodiment, the start command may include a command (e.g. instruction) to initiate capturing of the visual data.

If it is determined that the start command is not identified, the method 400 continues to receive the visual data. Once it is determined that the start command is identified, the visual data is captured. Note operation 406. Thus, identification of the start command may initiate capturing of the visual data. In one embodiment, the content of the visual data included in the frame of the visual data in which the start command is identified may be the first portion of the visual data to be captured. In another embodiment, the content of the visual data included in a frame of the visual data subsequent to the frame in which the start command is identified may be the first portion of the visual data to be captured.

Furthermore, it is determined whether a stop command is identified, as shown in operation 408. In one embodiment, as the visual data is received, the visual data may be read for identifying the stop command. For example, content of the visual data may be compared with predetermined content indicative of a stop command, such that a match may result in identification of the stop command. With respect to the present embodiment, the stop command may include a command (e.g. instruction) to terminate capturing of the visual data.

If it is determined that the stop command is not identified, the method 400 continues capturing of the received visual data. Once it is determined that the stop command is identified, capturing of the visual data is stopped. Note operation 410. To this end, a portion of the visual data received may be captured based on commands included in the visual data.

Figure 5A:
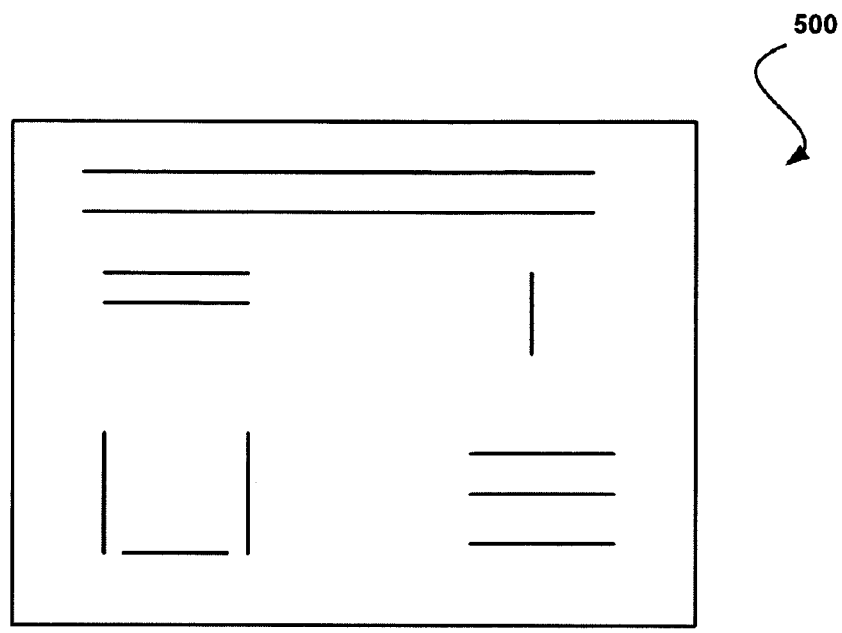
FIG. 5A shows a partial frame of media data, in accordance with another embodiment.

FIG. 5A shows a partial frame 500 of media data, in accordance with another embodiment. As an option, the frame 500 may be implemented in the context of the functionality and architecture of FIGS. 1-4. Of course, however, the frame 500 may be implemented in any desired environment. Again, it should be noted that the aforementioned definitions may apply during the present description.

In the context of the present embodiment, the partial frame 500 may include a partial frame of media data (e.g. a frame of video data, etc.) captured from a system. In the present embodiment, a portion of a frame (e.g. certain sequences of pixels, etc.) may be stored in separate memory. Further the partial frame 500 may be fed back to the system for being processed in a manner that saves bandwidth, etc. Of course, in other embodiments, the entire frame may be captured and stored.

As shown, the partial frame 500 may include a plurality of horizontal and vertical sequences of pixels. Thus, each pixel within the partial frame 500 of media data may be captured. Such information may further be fed back to the system, as noted above, such that the system may process the media data as a function of the commands included therein, may assess media processing capabilities of the system, utilizing the pixels, etc.

Figure 5B:
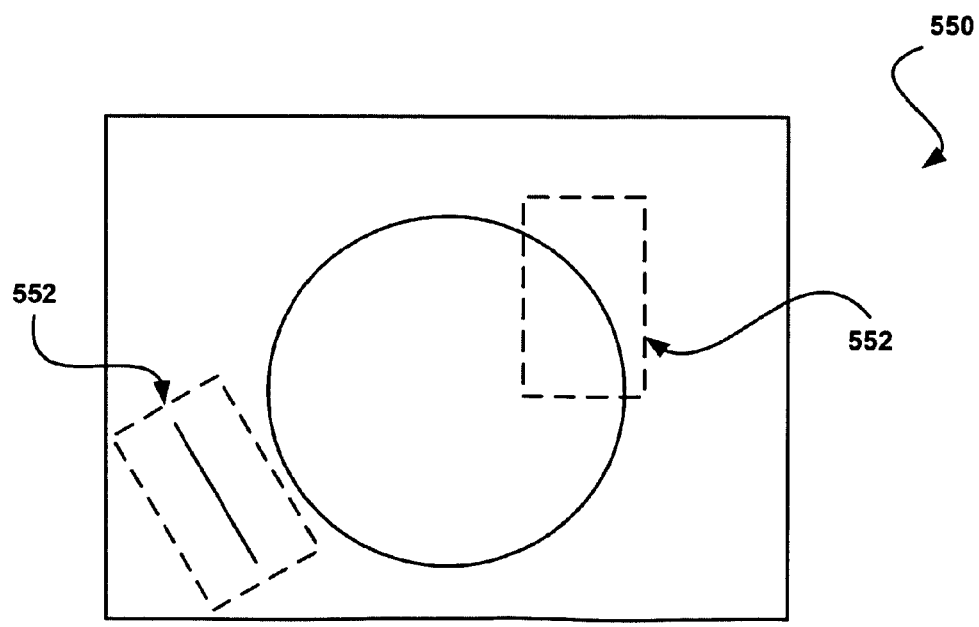
FIG. 5B shows a frame of media data from which a portion is stored, in accordance with yet another embodiment.

FIG. 5B shows a frame 550 of media data from which a portion is stored, in accordance with yet another embodiment. As an option, the frame 550 may be implemented in the context of the functionality and architecture of FIGS. 1-4. Of course, however, the frame 550 may be implemented in any desired environment. Again, it should be noted that the aforementioned definitions may apply during the present description.

In the context of the present embodiment, the frame 550 may include a frame of media data (e.g. a frame of video data, etc.) that is captured from a system. As shown, the frame 550 may include a plurality of pixels that form an image of a circle and a diagonal line outside of the circle. As an option, the image of the circle and/or the diagonal line may be scaled to a particular proportion.

As also shown, only a portion 552 of the frame 550 may be selected. The portion 552 may include any subset of the frame 550. For example, the portion 552 may include a subset of pixels included in the frame 550.

It should be noted that the portion 552 may be selected in any desired manner. In one embodiment, the portion 552 may be selected based on predetermined coordinates. For example, the predetermined coordinates may indicate pixels to be stored in memory. In another embodiment, the portion 552 may be identified utilizing a horizontal and vertical counter, pixel mask, frame counter, etc. In the context of the present description, a pixel mask may refer to a map of what pixels should be captured or are of interest. For instance, such mask may utilize a "0" to indicate that a pixel is not of interest, a "1" to indicate that a pixel is of interest, or visa versa. Still yet, different masks may be used for different frames, color planes, etc. In other embodiments involving audio media data, a wall clock, etc. may be used to identify the appropriate portion.

The selected portion 552 of the frame 550 may then be stored in memory separate from the system from which the frame 550 was captured. Storing only a selected portion 552 of the frame 550 may opportunistically limit the amount of memory consumption associated with storing captured media data, in one embodiment. Further, it may opportunistically require less processing power to achieve optimal bandwidth. Still yet, the portion 552 of the frame 550 may be fed back to the system from the memory for processing the portion 552 of the frame 500 as a function of commands included therein, for assessing media processing capabilities of such system, etc. Feeding back only the portion 552 of the frame 550 may optionally limit such assessment to be based on such portion 552, thus opportunistically reducing resource consumption associated with the system in performing the assessment of the media processing capabilities of the system.

Figure 6:
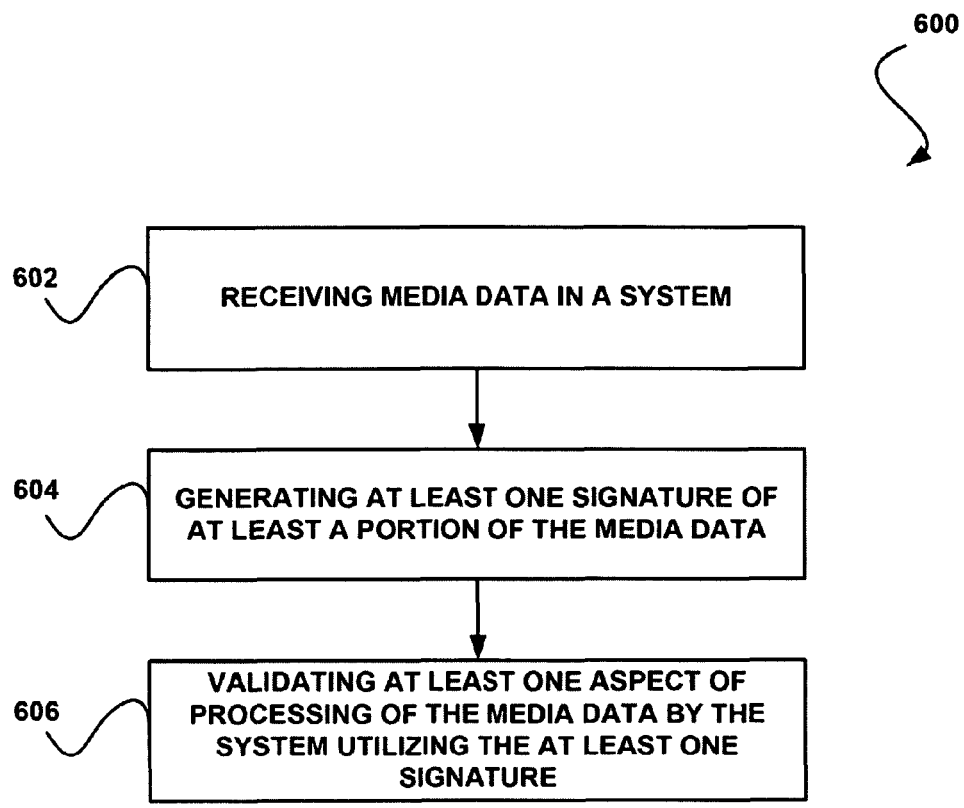
FIG. 6 shows a method for validating an aspect of media processing using a signature, in accordance with another embodiment.

FIG. 6 shows a method 600 for validating an aspect of media processing using a signature, in accordance with another embodiment. As an option, the method 600 may be carried out in the context of the functionality and architecture of FIGS. 1-5B. For example, the method 600 may be carried out utilizing the capture module 104 of FIG. 4. Of course, however, the method 600 may be carried out in any desired environment. Yet again, it should be noted that the aforementioned definitions may apply during the present description.

As shown in operation 602, media data in a system is received. In one embodiment, the media data (e.g. visual data, audio data, etc.) may be received from the system by a separate capture module. Of course, it should be noted that the media data may be received in any desired manner.

In addition, as shown in operation 604, at least one signature of at least a portion of the media data is generated. With respect to the present embodiment, the signature may include any unique identifier of the portion of the media data. For example, the signature may include a hash, checksum, etc. of the portion of the media data.

Optionally, a signature generating algorithm may receive as input the portion of the media data, and may calculate a signature for the portion of the media data using any or all of such portion of the media data. Just by way of example, at least one signature may be generated for each frame of the media data. As another example, color components of a frame of the media data may be utilized by the signature generating algorithm for generating the signature for the frame.

In one embodiment, the media data may include visual data and a plurality of signatures may be generated for each frame of the visual data. For example, a signature may be generated for each color component (e.g. R, G, B) of each frame of the visual data. Thus, a first signature may be generated for a first color component of a frame, a second signature may be generated for a second color component of the frame, and a third signature may be generated for a third color component of the frame.

In another embodiment, the media data may include visual data and a single signature may be generated for each frame of the visual data. As an option, such single signature may reflect all color components of the frame. As another option, the single signature may reflect only a subset of color components of the frame. For example, the color component used to generate the signature for each frame of the media data may alternate (e.g. a first color component may be used to generate a signature for a first frame, a second color component may be used to generate a signature for a second frame, a third color component may be used to generate a signature for a third frame, the first color component may be used to generate a signature for a fourth frame, the second color component may be used to generate a signature for a fifth frame, and so on).

Of course, while various embodiments of generating the signature for the portion of the media data have been described above, it should be noted that the signature for the portion of the media data may be generated in any desired manner. To this end, in various embodiments, a single signature may be generated for only a portion (e.g. subsection, a subset of pixels of each of a plurality of frames of the media data, etc.) of the media data, a plurality of signatures may be generated for only the portion of the media data, and/or a single signature may be generated for all of the media data.

As an option, the portion of the media data for which the signature is generated may be selected utilizing a mask (e.g. a pixel mask). For example, the mask may indicate which portion(s) of the media data for which a signature is to be generated. Just by way of example, the mask may indicate that a signature is to be generated for a predetermined sequence of pixels in each frame (e.g. every 5 pixels of each frame). Of course, however, the portion the media data for which the signature is generated may be selected in any desired manner.

Furthermore, at least one aspect of processing of the media data is validated by the system utilizing the at least one signature. Note operation 606. In one embodiment, the signature may be compared with another signature. Such other signature may include a signature predetermined for the media data, such as a signature determined for the media data prior to any processing of the media data by the system. As an option, the signature generated in operation 604 may include a signature generated for the media data after processing of the media data (e.g. by the system) has occurred.

Based on the comparison, it may be determined whether the signature and the other signature match. If the signatures match, it may optionally be determined that the media data has not changed. For example, it may be determined that processing of the media data by the system has not changed the media data (e.g. has not dropped frames of the media data or otherwise resulted in unwanted alterations of the media data). Thus, processing of the media data may optionally be validated by allowing the system to continue processing the media data in a same manner as the media data was previously processed.

If the signatures do not match, it may optionally be determined that the media data has changed. Just by way of example, it may be determined that processing of the media data by the system has changed the media data (e.g. has dropped frames of the media data or has otherwise resulted in unwanted alterations of the media data). As an option, one or more reference signatures may be used to identify the presence of such a problem. For example, a match with at least one signature may indicate a problem exists, and identification of the signature that was the subject of the match may shed more light on the specific nature/type of the problem.

Accordingly, processing of the media data may optionally be validated by disallowing the system to continue processing the media data in a same manner as the media data was previously processed. In one embodiment, the aspect of the processing of the media data by the system may be modified for preventing during subsequent processing of the media data the change to the media data identified utilizing the signature.

To this end, the signatures may be compared for assessing the media data, assessing processing capabilities of the system, etc. Of course, it should be noted that any aspect of processing of the media data may be validated by the system utilizing the at least one signature in any desired manner.

Figure 7:
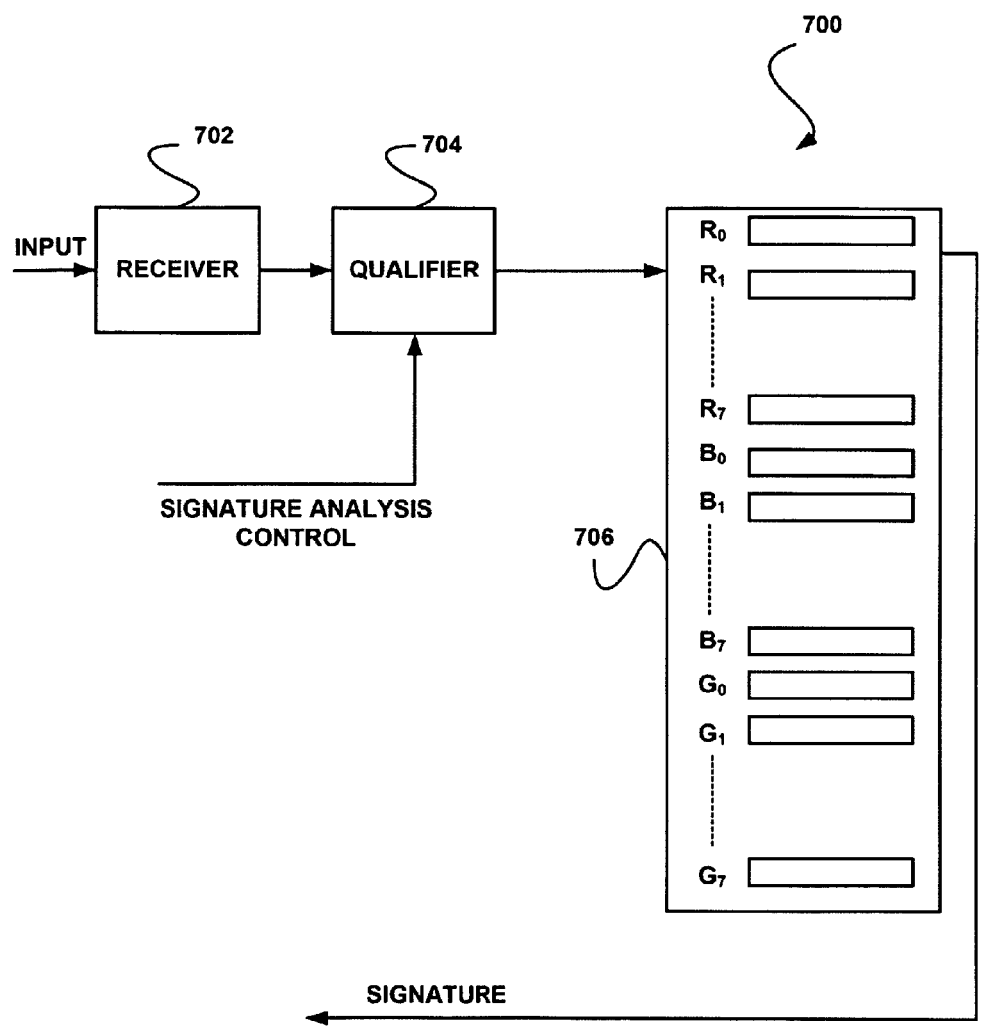
FIG. 7 shows a system for validating an aspect of media processing using a signature, in accordance with yet another embodiment.

FIG. 7 shows a system 700 for validating an aspect of media processing using a signature, in accordance with yet another embodiment. As an option, the system 700 may be implemented in the context of the functionality and architecture of FIGS. 1-6. For example, the system 700 may be implemented utilizing the capture module 104 of FIG. 4. Of course, however, the system 700 may be implemented in any desired environment. Again, it should be noted that the aforementioned definitions may apply during the present description.

As shown, input is received by a receiver 702. With respect to the present embodiment, the input may include media data. As an option, receiver 702 may include an interface receiver (e.g. an interface of a capture module). As another option, the media data may be received from a digital video interface.

In response to receipt of the media data by the receiver 702, the receiver communicates the media data to a qualifier 704. The qualifier 704 may include any module capable of qualifying the media data. For example, the qualifier 704 may qualify the media data by determining which portion of the media data is to be utilized for generating a signature for the media data.

In one embodiment, the qualifier 704 may receive signature analysis control bits from a signature analysis control, as shown, for qualifying the media data. For example, the signature analysis control bits may indicate a range of pixels (e.g. within a frame 706 of the media data) for which the signature is to be generated. The signature analysis control bits may indicate the range of pixels by indicating a starting pixel and a stopping pixel within a frame of the media data receive by the receiver 702, as another example.

The signature analysis control bits may also indicate which specific pixels, pixel values, etc. within the designated range are to be used for the generating the signature. Optionally, the signature analysis control bits may be designated by a mask (e.g. a pixel mask). Accordingly, in response to identification of a pixel determined to be for use in generating the signature, the qualifier 704 may output a signal (e.g. a clock signal) indicating that such pixel is to be used for generating the signature.

As another option, the qualifier 704 may receive at least one command. In one embodiment, the command may be included in a content portion of the media data. Additionally, the command may indicate a portion of the media data to be captured for generating the signature. For example, the command may include a start command and/or an end command. Thus, the signature may be conditionally generated based on the command.

It should be noted that the qualifier 704 may only be an optional component of the system 700. For example, in another embodiment (not shown) the system 700 may not include the qualifier 704, such that a signature may be generated based on all media data (e.g. pixels of the media data) received by the receiver 702.

As shown, the qualified pixels are selected from an array of pixels 706 for generating the signature. The array of pixels 706 may include pixels within a frame of the media data received by the receiver 702. Thus, the signature may be generated for the frame based on the qualification of pixels included therein. Of course, it should be noted that the signature may also be generated for a plurality of frames utilizing qualified pixels included in such frames. For example, the signature analysis control may indicate the pixels and frames for which the signature is to be generated. To this end, the signature may be conditionally generated based on the qualification of the media data.

As an option, the signature may be correlated with an identifier of the frame from which the signature was generated. Such identifier may include a number of the frame, a time stamp, etc. Thus, the identifier of the frame may indicate the portion of the media data from which the signature was generated.

Moreover, the signature (with the correlated frame identifier) may be communicated to the system from which the media data was received by the receiver 702. In one embodiment, the signature may be communicated to the system via a USB interface of the system. The system may thus perform a signature analysis on the media data. For example, the system may compare the signature to a signature previously generated for the media data based on the same qualification for determining whether the media data has changed (e.g. whether frames have been dropped, etc.). If it is determined that the media data has changed, an error may be generated (and optionally output). As another option, the signature may be communicated to the receiver 702, such that the receiver may perform a signature analysis on the media data.

Figure 8:
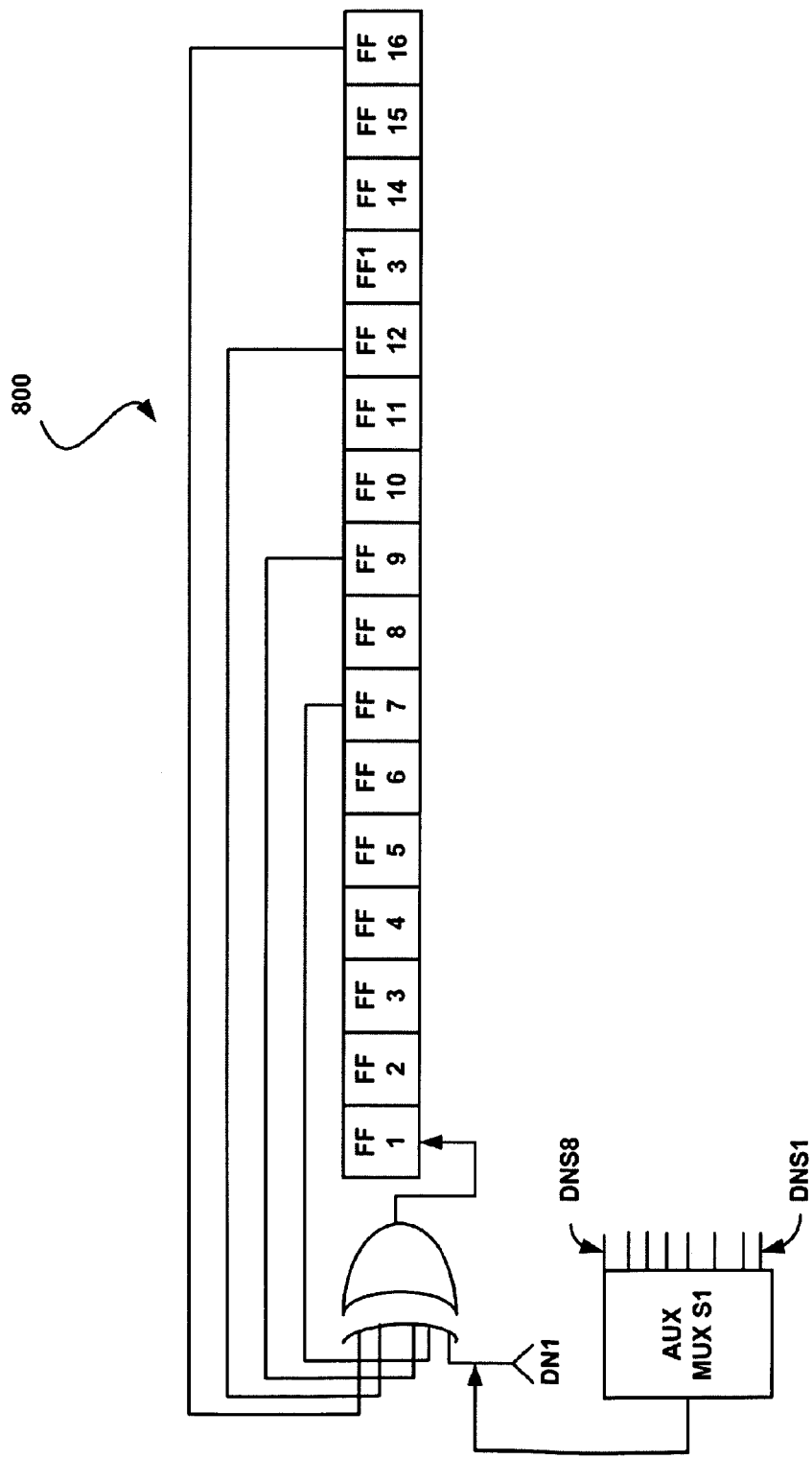
FIG. 8 shows a signature analysis system, in accordance with still yet another embodiment.

FIG. 8 shows a signature analysis system 800, in accordance with still yet another embodiment. As an option, the system 800 may be implemented in the context of the functionality and architecture of FIGS. 1-7. For example, the system 800 may be implemented utilizing the capture module 104 of FIG. 4. Of course, however, the system 800 may be implemented in any desired environment. Again, it should be noted that the aforementioned definitions may apply during the present description.

As shown, the signature analysis system 800 may include a circuit. As shown, the system 800 uses 16 flip flops (e.g. D flip flops) as a shift register with exclusive OR feedback taps. In response to receipt of a start command, such as a start control signal, media data is allowed to be fed into the system 800. For example, the media data may be fed into the flip flops.

As an option, the media data may be fed into the flip flops based on a clock signal, a qualify signal and a data signal. For each frame received by the system 800, the qualify signal may indicate the pixels from which data is to be fed into the flip flops. In addition, the data signal may indicate for each of such pixels indicated by the qualify signal the data therein that is to be fed into the flip flops. For example, the data signal may indicate at least one color value for each pixel indicated by the qualify signal.

Once data selected based on the qualify signal and the data signal is received at the signature analysis system 800, the clock signal is generated. The clock signal may be utilized for feeding the data into the flip flops. For example, upon generation of the clock signal, the data last received media data may input into the flip flops.

In one embodiment, the clock signal may be gated by the qualify signal. Thus, if the qualify signal is not enabled, a state of the flip flops may be maintained (e.g. data may not be fed into the flip flops). However, once the qualify signal resumes, data may be fed into the flip flops utilizing the clock signal.

Furthermore, in response to receipt of a stop command, such as a stop control signal, media data be prevented from being fed into the system 800. For example, the media data may be prevented from being fed into the flip flops. Still yet, the media data stored in the flip flops may represent a signature for the media data (e.g. for the frame of the media data including the data utilized to generate the signature). As an option, the signature may include a 4 digit hexadecimal number.

In one exemplary embodiment, line 200 of a frame of media data may represent a start command. Thus, upon line 200 of the frame being received by the system 800, the start command may be detected. In response to detection of the start command, the system 800 begins capturing the media data.

Additionally, the system 800 determines which data from the capture media data is to fed into the flip flops for generating the signature. The determination may be based on a data signal and a qualify signal. In another exemplary embodiment, line 700 of the frame of media data may represent a stop command, such that upon line 700 of the frame being received by the system 800, the stop command may be detected. In response to detection of the stop command, the system 800 may stop the capture of the media data.

To this end, in one exemplary embodiment, 24 signature analyzer circuits may be utilized for generating signatures for the media data. For example, one circuit may be provided for each bit of each component of a pixel of the frame. Accordingly, each signature analyzer circuit may generate a single signature for the media data.

Figure 9:
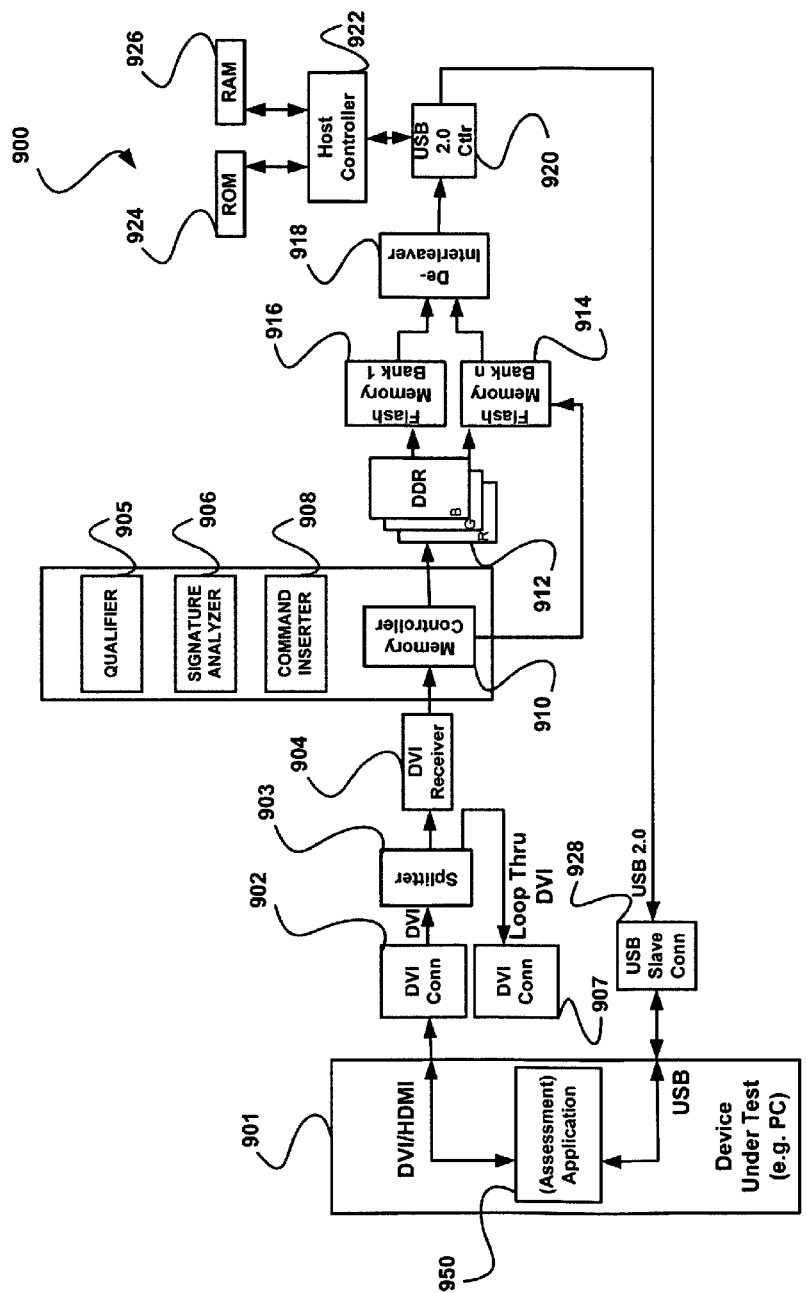
FIG. 9 shows a media processing system, in accordance with another embodiment.

FIG. 9 shows a media capture system 900, in accordance with another embodiment. As an option, the media capture system 900 may be implemented in the context of the functionality and architecture of FIGS. 1-8. Of course, however, the media capture system 900 may be implemented in any desired environment. Yet again, the aforementioned definitions may apply during the present description.

As shown, media data (e.g. pixel data, audio data, image, etc.) is captured from an interface (e.g. DVI, HDMI, etc.) of a system 901. In particular, the media data is captured utilizing a DVI connection 902. Thus, generated or otherwise processed media data capable of being presented via the system 901 may be captured. The media data may be captured from an assessment application 950 of the system 901. For example, the assessment application 950 may generate the media data.

In addition, the captured media data is sent to a splitter 903. The splitter 903 may enable the media data to be both channeled to a DVI receiver 904 as well as to another DVI connection 907. The other DVI connection 907 may include a connection to other system components (e.g. a display, etc.).

Upon receipt of the media data, the DVI receiver 904 forwards the media data to a memory controller 910. The memory controller 910 may select only a portion of the media data for storage. For example, the memory controller 910 may select a portion based on a command incorporated in a content portion of the media data (e.g. via the command inserter 908). In addition, at least one signature of at least a portion of the media data may be generated utilizing a signature analyzer 906. The portion of the media data based on which the signature is generated may be selected by a qualifier 905, in one embodiment. For example, the qualifier 905 may receive a signal indicating which components of pixels received by the DVI receiver 904 are to be utilized for generating the signature.

In another embodiment, the memory controller 910 may send the media data, or any selected portion thereof, and optionally the signature generated for such media data, to double data rate (DDR) memory 912, or any other type of memory for that matter. For example, the DDR memory 912 may include multiple DDR memory portions. In one embodiment, each portion of the DDR memory 912 may store pixel data that is associated with a different color.

Further, the media data is sent from the DDR memory 912 to a plurality of flash memory banks 914 and 916. For example, the media data from the DDR memory 912 may be interleaved among the flash memory banks 914 and 916. As an option, the interleaving may be controlled by the memory controller 910.

Still yet, media data communicated from the flash memory banks 914 and 916 is de-interleaved utilizing a de-interleaver module 918. In this, way, media data interleaved into the flash memory banks 914 and 916 may be de-interleaved. Such de-interleaving may include formatting the media data into the format in which the media data was captured from the system 901.

As also shown, a USB 2.0 controller 920 receives the de-interleaved media data from the de-interleaver module 918. In one embodiment, the USB 2.0 controller 920 may be used by an assessment application 950 to control the capturing of the media data from the system 901. For example, the USB 2.0 controller 920 may, under the control of the assessment application 950, instruct the DVI receiver 904, via a USB interface of the system 901, to receive media data from the system 901 during an indicated time period (e.g. a time period between a start time and stop time, etc.). Of course, other techniques are also contemplated for controlling the manner in which the media data is captured and stored (e.g. indicating a pixel structure, using a pixel mask for active pixels to be captured, etc.).

In use, the USB 2.0 controller 920 may communicate the media data to a host controller 922, which stores the media data in memory. As shown, the host controller 522 may write the media data to read-only memory (ROM) 924 and/or random access memory (RAM) 926.

Moreover, the host controller 922 may read the stored media data from the ROM 924 and/or RAM 926. In one embodiment, the host controller 922 may read the stored media data in response to an instruction from the assessment application 950 executed on the system 901. Optionally, such instruction may be received from the system 901 by the memory controller 922 via the USB interface of the system 901. Thus, the ROM 924 and/or RAM 926 may be used to temporarily store the media data.

After reading the stored media data from the ROM 924 and/or RAM 926, the host controller 922 communicates the media data to the USB 2.0 controller 920. The USB 2.0 controller 920 further communicates the media data back to the system 901 via a USB slave connection 928. Further, the assessment application 950 of the system 901 may receive the media data captured therefrom for use in assessing processing capabilities of such system 901.

For example, in various embodiments, different tests may be performed by the assessment application 950. In one embodiment, the assessment application 950 may determine whether each of a plurality of frames captured during a predetermined time period were, in fact, rendered. In another embodiment, visual values (e.g. color values, etc.) may be evaluated, etc. In yet another embodiment, the assessment application 950 may compare the received media data with a more ideal copy of the media data (e.g. golden copy, an unprocessed copy of the media data, etc.) for assessing processing capabilities of the system 901. Of course, such exemplary assessments are set forth for illustrative purposes only and should not be construed as limiting in any manner whatsoever.

Figure 10:
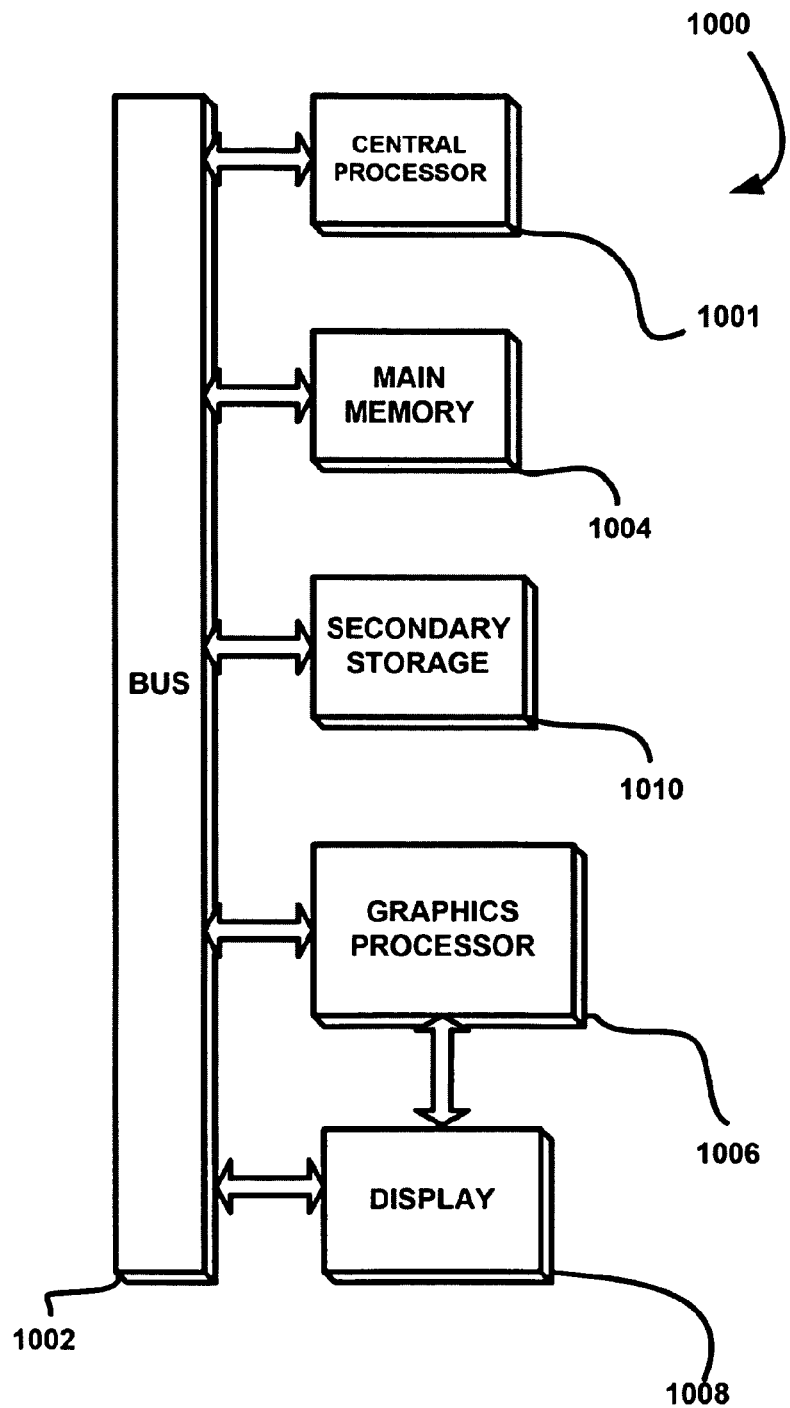
FIG. 10 shows an exemplary system in which the various architecture and/or functionality of the various previous embodiments may be implemented.

FIG. 10 illustrates an exemplary system 1000 in which the various architecture and/or functionality of the various previous embodiments may be implemented. As shown, a system 1000 is provided including at least one host processor 1001 which is connected to a communication bus 1002. The system 1000 also includes a main memory 1004. Control logic (software) and data are stored in the main memory 1004 which may take the form of random access memory (RAM).

The system 1000 also includes a graphics processor 1006 and a display 1008, i.e. a computer monitor. In one embodiment, the graphics processor 1006 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 1000 may also include a secondary storage 1010. The secondary storage 1010 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 1004 and/or the secondary storage 1010. Such computer programs, when executed, enable the system 1000 to perform various functions. Memory 1004, storage 1010 and/or any other storage are possible examples of computer-readable media.

In one embodiment, the architecture and/or functionality of the various previous figures may be implemented in the context of the host processor 1001, graphics processor 1006, an integrated circuit (not shown) that is capable of at least a portion of the capabilities of both the host processor 1001 and the graphics processor 1006, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 1000 may take the form of a desktop computer, lap-top computer, and/or any other type of logic. Still yet, the system 1000 may take the form of various other devices including, but not limited to, a personal digital assistant (PDA) device, a mobile phone device, a television, etc.

Further, while not shown, the system 1000 may be coupled to a network [e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   receiving media data in a system;
   identifying a portion of the media data using commands incorporated in content of the media data;
   generating at least one signature of the portion of the media data; and
   validating at least one aspect of processing of the media data by the system utilizing the at least one signature, where the validating includes determining whether the processing of the media data by the system has changed one or more elements of the media data;
   wherein for each of the commands, the command is incorporated by setting a color value associated with at least one pixel of the content of the media data, and wherein the color value is predetermined to reflect the command such that the command is identified upon encountering the at least one pixel having the color value indicative of the command.

2. The method of claim 1, wherein the at least one signature is generated for at least one frame of the portion of the media data.

3. The method of claim 2, wherein a first signature is generated for a first color component of the frame, a second signature is generated for a second color component of the frame, and a third signature is generated for a third color component of the frame.

4. The method of claim 1, wherein a single signature is generated for each frame of the portion of the media data.

5. The method of claim 4, wherein the single signature reflects all color components of the frame.

6. The method of claim 4, wherein the single signature reflects only a subset of color components of the frame.

7. The method of claim 1, wherein the validating includes comparing the at least one signature with at least one other signature determined for the portion of the media data prior to any processing of the media data by the system.

8. The method of claim 7, wherein if the at least one signature and the at least one other signature match, then it is determined that the one or more elements of the media data have not changed.

9. The method of claim 1, wherein the commands include a start command indicating a start of the portion of the media content and a stop command indicating an end of the portion of the media data.

10. A computer program product embodied on a non-transitory computer readable medium, comprising:
   computer code for receiving media data in a system;
   computer code for identifying a portion of the media data using commands incorporated in content of the media data;
   computer code for generating at least one signature of the portion of the media data; and
   computer code for validating at least one aspect of processing of the media data by the system utilizing the at least one signature, where the validating includes determining whether the processing of the media data by the system has changed one or more elements of the media data;
   wherein for each of the commands, the command is incorporated by setting a color value associated with at least one pixel of the content of the media data, and wherein the color value is predetermined to reflect the command such that the command is identified upon encountering the at least one pixel having the color value indicative of the command.

11. An apparatus, comprising:
   an interface receiver for receiving media data from a system; and
   at least one of hardware and software for identifying a portion of the media data using commands incorporated in content of the media data and generating at least one signature of the portion of the media data;
   wherein at least one aspect of processing of the media data by the system is validated utilizing the at least one signature, where the validating includes determining whether the processing of the media data by the system has changed one or more elements of the media data;
   wherein for each of the commands, the command is incorporated by setting a color value associated with at least one pixel of the content of the media data, and wherein the color value is predetermined to reflect the command such that the command is identified upon encountering the at least one pixel having the color value indicative of the command.

12. The apparatus of claim 11, wherein the system includes a processor coupled to memory via a bus.

* * * * *